United States Patent [19]

Drenckhan et al.

[11] 4,324,492
[45] Apr. 13, 1982

[54] METHOD OF AND ARRANGEMENT FOR PERFORMING OPTICAL INTERFERENCE MEASUREMENTS

[76] Inventors: Jürgen Drenckhan, Greifswald; Roland Trinks, Querfurt, both of German Democratic Rep.

[21] Appl. No.: 40,935

[22] Filed: May 21, 1979

[30] Foreign Application Priority Data

Jun. 1, 1978 [DD] German Democratic Rep. ... 205706

[51] Int. Cl.³ .......................... G01B 9/02; G02B 5/14
[52] U.S. Cl. .................. 356/345; 350/96.12
[58] Field of Search .......... 350/96.12, 96.19; 356/345, 354, 355, 356

[56] References Cited

U.S. PATENT DOCUMENTS

3,560,724  2/1971  Condell, Jr. ............... 350/96.12
3,674,335  7/1972  Ashkin et al. ............. 350/96.19

*Primary Examiner*—John K. Corbin
*Assistant Examiner*—Bruce Y. Arnold

[57] ABSTRACT

The invention is concerned with a method of and an arrangement for performing optical interference measurements by use of integrated optical means. The arrangement is comprised of a multi-mode waveguide mounted on a carrier means. A cover layer of dielectric material is disposed upon said multi-mode waveguide. The refractive index of the dielectric cover-layer is greater than that of the waveguide. Two modes are coupled to the waveguide the effective refractive indices of said modes differ from each other in such a manner that an interference period results which is detected through a sequence of photodetectors, being arranged in the cover layer and energetically coupled to the waveguide. The relative phase position of both modes varied through a measuring operation is measured. One of the photodetectors is employed to incrementally count the phase displacements and the other photodetectors are operative as an optical vernier so subdividing the scale in dependence on the number of photodetectors.

2 Claims, 1 Drawing Figure

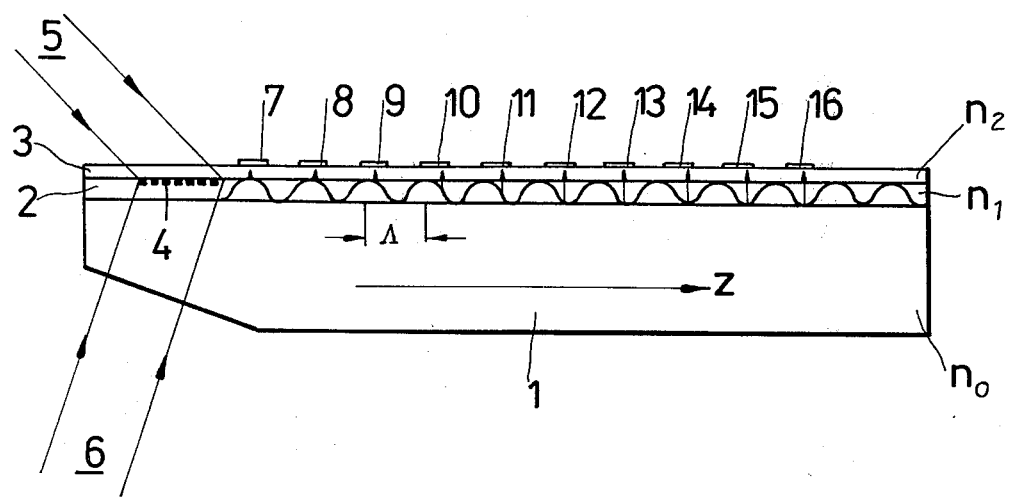

METHOD OF AND ARRANGEMENT FOR PERFORMING OPTICAL INTERFERENCE MEASUREMENTS

The invention is in concern of a method of optical interference measurements and an integrated optical arrangement for performing the former, particularly for use in incremental lengths and angle measurements.

In a known arrangement for interference measurements which employs integrated optical components a light beam is decomposed in a waveguide layer into two portions through a first partially transmissive element. The two portions are directed by means of reflecting elements to a second partially transmissive element which fuses the two beam portions for interference formation.

The production costs of such an arrangement which satisfies the required reflective and transmissive properties are considerable. Furthermore, the position of the reflecting elements relative to the partially transmissive elements is of importance to the function of the measuring arrangement, which involves considerable technological problems.

It is an object of the invention to obviate the above disadvantages.

It is a further object of the invention to provide a method of and an integrated optical arrangement for interference measurements which have the advantage of a compact design, low production costs, low sensitivity towards vibration and temperature, and low energy requirements.

The invention is concerned with a method of optical interference measurements by use of an integrated optical arrangement, wherein two modes are coupled into a waveguide, are brought to interference within the waveguide, and wherein the phase positions of the two modes relative to each other varied through a measuring operation are measured. The method is carried out by an arrangement for optical interference measurement, in which a multi-mode waveguide is arranged between a carrier means and a cover layer, the refractive index of the waveguide differs with respect to two coupled-in modes in such a manner that an interference period results, the individual maxima of which are detected by a sequence of photocells disposed in the cover layer and energetically connected to the waveguide, characterised in that a first photocell of said sequence is provided for measuring the resulting phase shifts in $\lambda/2$ units, and a second photodetector, being staggered relative to the first by half an interference period, is provided to detect the direction of the phase change, and the remaining photocells of said sequence detect the displacements in $\lambda/2$ division units in dependence on the number of photocells.

In order that the invention may be more readily understood reference is made to the accompanying drawing which illustrates diagrammatically and by way of example one embodiment thereof and where the drawing is a schematical view of the inventional arrangement.

In the FIGURE a two-modes waveguide 2 covered by a dielectric layer 3 of lower refractive index than that of the waveguide 2 is arranged upon a carrier 1. At one end of the waveguide a coupling grate 4 is arranged. A first laser beam 5 comprising the $TE_o$ mode impinges upon the coupling grate 4 under the synchronizing angle with respect to this mode so that the $TE_o$ mode is excited in the waveguide 2. A second laser beam 6 comprising the $TE_1$ mode is directed to the coupling grate 4 under the respective synchronizing angle.

Thus the $TE_1$ mode is simultaneously excited in the waveguide 2. The properties of the waveguide 2 are so selected that the effective refractive indices of the $TE_o$ mode and of the $TE_1$ mode differ only insignificantly.

The following values are given as an example:

$$TE_0 \cdot n_{eff0} = \frac{k_{z0}}{k} = 1.51152$$

$$\Delta k_z = 0.0157$$

$$TE_1 \cdot n_{eff1} = \frac{k_{z1}}{k} = 1.5136$$

where $n_{eff}$ is te effective refractive index in the propagation direction of the laser energy, $k_z$ the wave number of the laser light, and $\Delta k_z$ the difference of the wave numbers in z-direction.

When, as in the above example, the $k_z$ values differ by 0.0157 an interference pattern results in the waveguide which has a period of 400 $\mu$m in the z-direction $\lambda z = (2\pi/\Delta k_z)$.

Minute coupling gratings (not shown) having a width of about 20 $\mu$m are arranged on the surface of the waveguide spaced apart by 420 $\mu$m. Said gratings are of low decoupling effectivity. The energy decoupled through these gratings impinges upon photodiodes 9–16, which are, for example, attached by adhesive means to a dielectric layer. In the example the detected intensity continuously decreases in z-direction due to the intensity maxima. When a laser beam 5 and the laser beam 6 are produced through the positive first deflection order and through the negative first deflection order of an illuminated grid scale then the interference pattern moves in z-direction by $2\lambda$ in the waveguide 2 provided that the measuring grating is displaced about one grate period.

By means of a first photodetector 7 an incremental counting is carried out in units of half periods of the measuring grate. The photodetectors 7–16 operate in their unity as an optical vernier so that one twentieth of the measuring grate period can be given as a measuring unit.

A backward or forward movement of the measuring grating can be detected when a second photodetector (not shown in the drawing) is provided in addition to the first photodetector 7, however, staggered to the first photodetector by $\lambda/4$.

The sinusoidal line shown in the waveguide 2 is a schematical representation of the intensity distribution.

We claim:

1. Method of optical interference meansurement by means of an integrated optical arrangement, comprising the steps of coupling two modes to a waveguide, effecting interference between said two modes within said waveguide, and measuring the relative phase positions of both modes varied through a measuring operation.

2. An integrated optical arrangement for optical interference measurements, comprising
   a multi-mode optical waveguide,
   a carrier means,
   a cover layer of transparent dielectric material, said multi-mode waveguide being sandwiched between said carrier means and said cover layer, a sequence of photodetectors being disposed in spaced relation on the surface of said cover layer remote from said waveguide, said sequence of photodetectors representing an optical vernier, an interference grating inserted in the surface of said waveguide adjacent an end portion of said waveguide, a light source emitting two modes of coherent light to said interference grating for producing interference patterns, said optical waveguide having different refractive indices for said two modes, said different refractive indices defining an interference period, said sequence of photodetectors for detecting the interference maxima of said interference pattern propagating within said waveguide, a first photodetector of said sequence of photodetectors being nearest to said interference grating for detecting phase shifts in $\lambda/2$ units resulting from the interference pattern formation, a second photodetector of said sequence of photodetectors, being staggered relative to said first photodetector by half an interference period, said second photodetector being for detecting the direction of the phase shifts.

* * * * *